Figure 1:
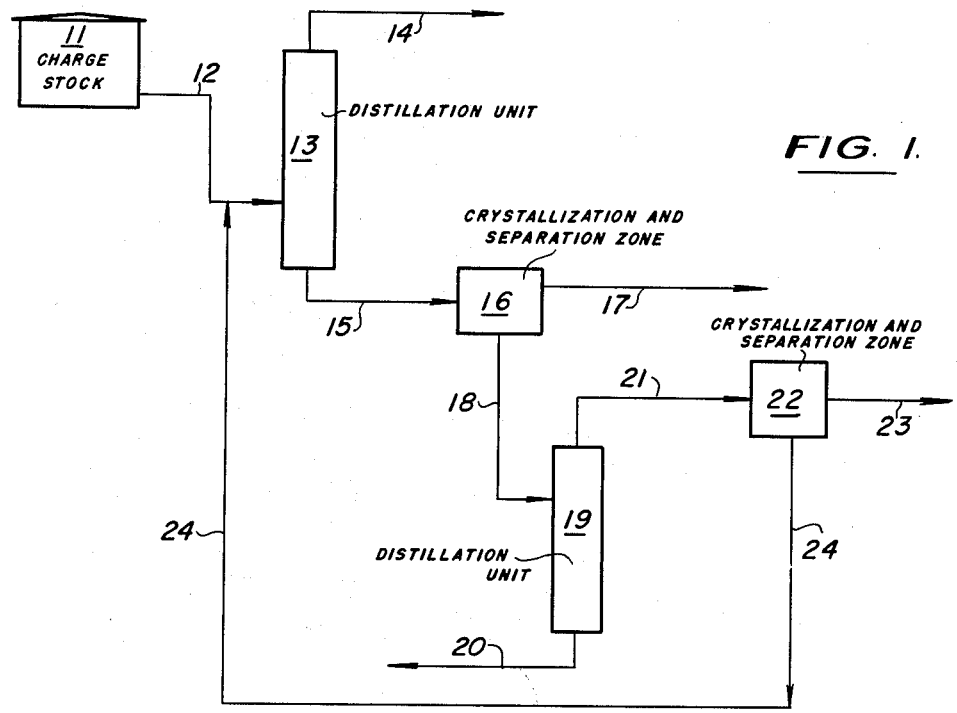

July 31, 1956 R. B. BENNETT ET AL 2,757,215
RECOVERY OF HIGH PURITY ORTHOXYLENE CONCENTRATE
Filed Sept. 2, 1953

INVENTORS.
Raymond A. Speed,
BY Rufus B. Bennett,

ATTORNEY.

United States Patent Office 2,757,215
Patented July 31, 1956

2,757,215
RECOVERY OF HIGH PURITY ORTHOXYLENE CONCENTRATE

Rufus B. Bennett and Raymond A. Speed, Baytown, Tex., assignors, by mesne assignments, to Esso Research and Engineering Company, Elizabeth, N. J., a corporation of Delaware Application September 2, 1953, Serial No. 378,056

4 Claims. (Cl. 260—674)

The present invention is directed to a method for recovering a high purity orthoxylene concentrate. Objects and advantages of the present invention will be seen from the following description taken in conjunction with the drawing in which Fig. 1 is in the form of a diagrammatic flow sheet illustrating one method for carrying out the present invention; and, Fig. 2 is in the form of a diagrammatic flow sheet illustrating another method for carrying out the present invention.

Figure 2:
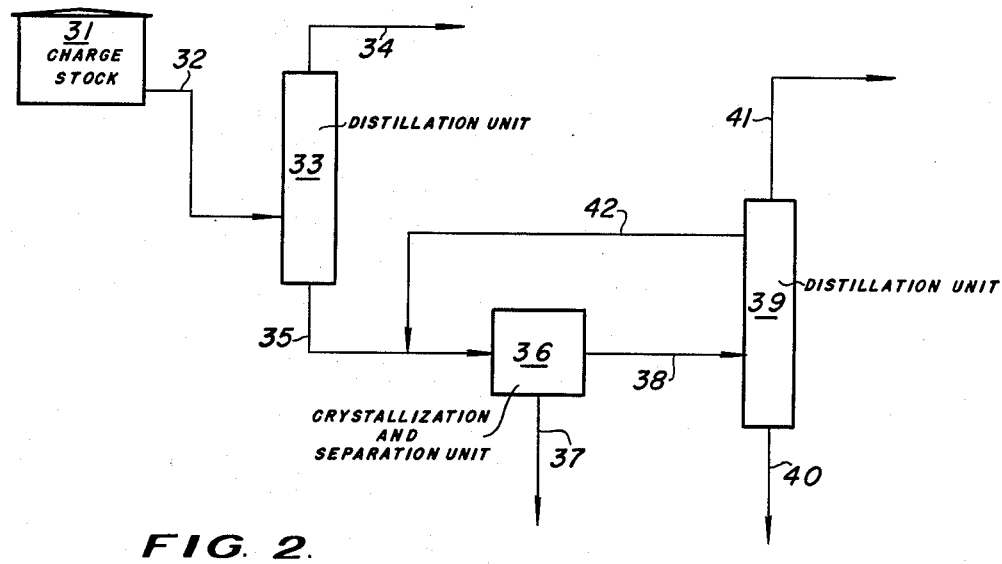

Turning now specifically to Fig. 1, a hydrocarbon feed stock consisting of a mixture of isomeric xylenes and contaminated with a small amount of high boiling $C_9$ aromatics is charged from stock tank 11 through line 12 to distillation unit 13. In unit 13 material lighter boiling than the desired orthoxylene, together with a small amount of orthoxylene, is removed as overhead and discarded through outlet line 14 and a bottoms fraction is withdrawn through outlet line 15 and passed to a crystallization and separation unit 16. It will be understood that while distillation unit 13 is shown as a single vessel in the drawing, actually it may consist of several distillation columns with auxiliary equipment and similarly while crystallization and separation unit 16 is shown as a single rectangle in the drawing, actually it may consist of a number of several vessels such as chillers and crystallizing tanks as well as a means for separating resultant crystals from mother liquor such as basket centrifuges.

From crystallization and separation unit 16 a crystallized product consisting, for example, of 98% orthoxylene is withdrawn through line 17 as desired product from the system. Mother liquor is withdrawn from crystallization and separation unit 16 through line 18 and passed to a second distillation unit 19 where it is separated into a bottoms fraction consisting primarily of $C_9$ aromatics which are withdrawn through outlet line 20 and discarded from the system and an overhead fraction which is withdrawn from distillation unit 19 through line 21. The overhead fraction in line 21 is sent to a second crystallization and separation unit 22. Distillation unit 19 and crystallization and separation units 22, while shown simply as rectangles may each consist of several components similarly to units 13 and 16.

From crystallization and separation unit 22 a crystallized product, such as a filter cake consisting of 98% orthoxylene is withdrawn through line 23 as desired product. It will be understood that the product in line 17 and that in line 23 may have substantially the same composition and usually will be combined as the output of the unit. From crystallization and separation unit 22 mother liquor is withdrawn through line 24. This mother liquor contains a substantial amount of orthoxylene which may be recovered by further treatment and for that reason is recycled and admixed in line 12 with fresh feed stock and sent with the fresh feed to distillation unit 13. It will be understood that materials recycled through line 24 which are lower boiling than the orthoxylene as well as those higher boiling than orthoxylene will be discarded in distillation unit 13 and thus will be prevented from building up in the system. Thus, what orthoxylene is discarded from the system is discarded in small amounts with other materials as in the overhead from distillation unit 13 and in the bottoms from distillation unit 19. These are relatively small amounts so that the major portion of the orthoxylene charged to the unit is recovered as desired product.

By way of example, a typical feed stock which may be charged to the method illustrated by the flow sheet of Fig. 1 may have an analysis as follows:

| Analysis, mol percent: | Fresh feed |
|---|---|
| Toluene | 1.5 |
| Ethylbenzene | 20.9 |
| Paraxylene | 15.4 |
| Metaxylene | 41.9 |
| Orthoxylene | 18.9 |
| $C_9$ aromatics | 1.4 |

In distillation unit 13 this feed stock may be separated into an overhead fraction and a bottoms fraction having the following compositions:

| Analysis, Mol Percent | Overhead | Bottoms |
|---|---|---|
| Toluene | 2.5 | 0.0 |
| Ethylbenzene | 24.1 | 0.0 |
| Paraxylene | 17.8 | 1.5 |
| Metaxylene | 46.8 | 7.9 |
| Orthoxylene | 8.8 | 70.5 |
| $C_9$ Aromatics | | 20.1 |

In further processing the bottoms fraction, two cases will be assumed. In case I crystallization and separation unit 16 will be operated at a temperature of —52° F. and crystallization and separation unit 22 will be operated at a temperature of —93° F. In case II crystallization and separation unit 16 will be operated at a temperature of —100° F. and crystallization and separation unit 22 will be operated at a temperature of —90° F.

Considering first case I from crystallization and separation unit 16 a filter cake and a filtrate are obtained with the following analysis:

| Analysis, Mol Percent | Filter Cake | Filtrate |
|---|---|---|
| Toluene | | |
| Ethylbenzene | | |
| Paraxylene | | |
| Metaxylene | 0.5 | 11 |
| Orthoxylene | 98.0 | 59 |
| $C_9$ Aromatics | 1.5 | 28 |

The filtrate is sent to distillation unit 19 where it is separated into an overhead fraction and a bottoms fraction having the following anlysis:

| Analysis, Mol Percent | Overhead | Bottoms |
|---|---|---|
| Toluene | | |
| Ethylbenzene | | |
| Paraxylene | 2.6 | |
| Metaxylene | 14.0 | |
| Orthoxylene | 77.2 | 4.0 |
| $C_9$ Aromatics | 6.2 | 96.0 |

In turn, the overhead from distillation unit 19 is sent to the crystallization and separation unit 22 where it is separated into a filter cake and a filtrate having the following analysis:

| Analysis, Mol Percent | Filter Cake | Filtrate |
|---|---|---|
| Toluene | | |
| Ethylbenzene | | |
| Paraxylene | 0.2 | 8.4 |
| Metaxylene | 1.2 | 45.3 |
| Orthoxylene | 98.0 | 26.5 |
| $C_9$ Aromatics | 0.6 | 19.8 |

As previously explained, the filtrate from crystallization and separation unit 22 is recycled and admixed with fresh feed. The foregoing typical compositions are based on a once through basis.

In case II where crystallization and separation unit 16 is operated at a temperature of −100° F. and crystallization and separation unit 22 is operated at a temperature of −90° F., the filter cake and filtrate withdrawn from crystallization and separation unit 16 will have the following typical composition:

| Analysis, Mol Percent | Filter Cake | Filtrate |
|---|---|---|
| Toluene | | |
| Ethylbenzene | | |
| Paraxylene | | 3.9 |
| Metaxylene | 0.6 | 20.6 |
| Orthoxylene | 98 | 23.0 |
| C$_9$ Aromatics | 1.4 | 52.5 |

The mother liquor is then sent to distillation unit 19 where it is separated into an overhead fraction and a bottoms fraction having the following composition:

| Analysis, Mol Percent | Overhead | Bottoms |
|---|---|---|
| Toluene | | |
| Ethylbenzene | | |
| Paraxylene | 7.2 | |
| Metaxylene | 38.0 | |
| Orthoxylene | 41.5 | 1 |
| C$_9$ Aromatics | 13.3 | 99 |

The overhead fraction is then sent to crystallization and separation unit 22 where it is separated into a filtrate and a filter cake fraction having a composition as follows:

| Analysis, Mol Percent | Filter Cake | Filtrate |
|---|---|---|
| Toluene | | |
| Ethylbenzene | | |
| Paraxylene | 0.3 | 8.9 |
| Metaxylene | 1.3 | 46.7 |
| Orthoxylene | 98 | 28.2 |
| C$_9$ Aromatics | 0.4 | 16.2 |

Another method for carrying out the invention of the present application will now be described in conjunction with Fig. 2.

In Fig. 2 a mixed hydrocarbon feed stock containing a substantial amount of the desired orthoxylene in admixture with isomeric xylenes and other lower boiling hydrocarbons and higher boiling materials such as C$_9$ aromatics is charged from stock tank 31 through line 32 to distillation unit 33. In distillation unit 33 an overhead fraction consisting of materials lighter boiling but containing a small amount of orthoxylene is withdrawn as overhead through line 34. A bottoms fraction containing the desired orthoxylene is withdrawn through line 35 admixed with a recycle stream introduced through line 42 to form a mixture and the mixture sent to crystallization and separation unit 36. From crystallization and separation unit 36 a filter cake, which is a high concentrate orthoxylene, is withdrawn as desired product through outlet 37 and a filtrate containing a substantial amount of orthoxylene but contaminated by lower boiling and higher boiling impurities is withdrawn through line 38 and sent to a second distillation unit 39. In distillation unit 39 a bottoms fraction consisting primarily of higher boiling C$_9$ aromatics is withdrawn through line 40 and discarded from the system and an overhead consisting of a mixture of lower boiling isomeric xylenes, as well as some orthoxylenes, is withdrawn through line 41 and discarded from the system. A side stream fraction consisting primarily of orthoxylene but contaminated with lower and higher boiling materials is withdrawn through line 42 as recycle admixed with feed line 35 to form the mixture changed to crystallization and separation unit 36.

By way of further illustration, the following example showing typical feed stocks and typical compositions from the various stages is given. For convenience, this example will be designated case III.

In case III the feed stock in stock tank 31, and the overhead and bottoms from distillation unit 33 will be assumed to be identical to the coresponding fractions of Fig. I as in cases I and II heretofore described. Assuming that the crystallization and separation unit is operated at a minimum temperature of −52° F. the compositions of the filter cake withdrawn through line 37 and of the mother liquor withdrawn through line 38 are as follows:

| Analysis, Mol Percent | Filter Cake | Filtrate |
|---|---|---|
| Toluene | | |
| Ethylbenzene | | |
| Paraxylene | | 2 |
| Metaxylene | 0.5 | 11 |
| Orthoxylene | 98.0 | 59 |
| C$_9$ Aromatics | 1.5 | 28 |

In distillation unit 39, the compositions of the bottoms, side stream and overhead are as follows:

| Analysis, Mol Percent | Bottoms | Side Stream | Overhead |
|---|---|---|---|
| Toluene | | | |
| Ethylbenzene | | | |
| Paraxylene | | 1.3 | 11.6 |
| Metaxylene | | 8.3 | 52.1 |
| Orthoxylene | 4 | 83.3 | 36.2 |
| C$_9$ Aromatics | 96 | 7.1 | |

The foregoing compositions in case II are on a once through basis. It will be understood that under steady state conditions the side stream from line 42 is added to the bottoms in line 35 and changes the composition of the feed to crystallization and separation unit 36. However, the orthoxylene loss from the unit is by way of a small amount in admixture with the C$_9$ aromatics in the bottoms discharged by line 40 from distillation unit 39 and a small amount withdrawn in admixture with paraxylene and metaxylene as overhead from distillation unit 39 through outlet 41. This overhead fraction leaving distillation unit 39 through line 41 has a paraxylene to orthoxylene ratio corresponding to the eutectic composition of these components. For example, in the steady state operation with an input through line 35 of 1000 barrels a day of a feed stock having the composition of 1.5% paraxylene, 7.9% metaxylene, 70.5% orthoxylene and 20.1% C$_9$ aromatics 659 barrels of filter cake are withdrawn through line 37, 199 barrels of bottoms are withdrawn through line 40 and 142 barrels of overhead are discarded through line 41.

What we wish to claim is:

1. A method for concentrating a hydrocarbon feed stock fraction consisting of approximately 20% C$_9$ aromatics, approximately 70% orthoxylene and the remainder isomeric xylenes which includes the steps of chilling said feed stock fraction thereby forming a slurry of orthoxylene crystals and mother liquor, separating said slurry into a filter cake of orthoxylene crystals and a filtrate, distilling said filtrate to separate therefrom a distillate fraction containing substantially all the orthoxylene charged to the distillation and chilling the components of said distillate fraction to recover orthoxylene therefrom in crystalline form in a filter cake.

2. A method for separating a hydrocarbon feed stock fraction consisting of approximately 20% C$_9$ aromatics, approximately 70% orthoxylene and the remainder isomeric xylenes which includes the steps of chilling feed stocks fraction in a chilling zone thereby forming a slurry of orthoxylene crystals in mother liquor, separating said slurry into a first filter cake fraction of orthoxylene crystals and a filter fraction, distilling said filtrate fraction to separate therefrom a distillate fraction containing substantially all the orthoxylene charged to the distillation and chilling said distillate fraction to crystallize orthoxylene therefrom and recovering said crystallized orthoxylene as a second filter cake fraction.

3. A continuous method for concentrating a hydrocarbon feed stock fraction consisting of approximately 20% C$_9$ aromatics, approximately 70% orthoxylene and the remainder isomeric xylenes which includes the steps of forming feed stock into a stream, continuously passing said stream to a crystallization zone to crystallize orthoxylene therein and to form a slurry of orthoxylene crystals and mother liquor, withdrawing a stream of said slurry from said crystallization zone and separating it into a filter cake fraction of orthoxylene crystals and filtrate fraction, distilling said filtrate fraction to separate therefrom a distillate containing substantially all the orthoxylene charged to the distillation and admixing said distillate fraction with fresh feed stock to form the stream which is continuously passed to said crystallization zone.

4. A method for recovering orthoxylene in high yield and high purity from a feed stock containing orthoxylene, its isomers, and close boiling hydrocarbons, which comprises submitting said feed stock to a first fractional distillation to produce a first distillate fraction consisting primarily of orthoxylene isomers and at least a second fraction consisting of approximately 70% orthoxylene, 20% C$_9$ aromatics and the remainder isomeric xylenes, chilling said second fraction and thereby forming a first slurry of orthoxylene crystals and mother liquor, separating said first slurry into a first filter cake of orthoxylene crystals and a first filtrate, recovering said first filter cake as product, submitting said first filtrate to a second fractional distillation to separate therefrom a third distillate fraction containing substantially all the orthoxylene charged to said second distillation and at least a fourth fraction consisting primarily of C$_9$ hydrocarbons, discarding said fourth fraction, chilling said third fraction to form a second slurry of orthoxylene in mother liquor, recovering orthoxylene in crystalline form as a filter cake and a second filtrate from said second slurry and returning said second filtrate to one of said fractional distillation steps.

References Cited in the file of this patent

UNITED STATES PATENTS

| | | |
|---|---|---|
| 1,940,065 | Spannagel et al. | Dec. 19, 1933 |
| 1,940,611 | Strosacker et al. | Dec. 19, 1933 |
| 2,383,174 | Weir | Aug. 21, 1945 |